July 2, 1968  R. P. WYKES  3,390,853
VARIABLE GEOMETRY RE-ENTRY VEHICLE
Filed May 23, 1966  3 Sheets-Sheet 1
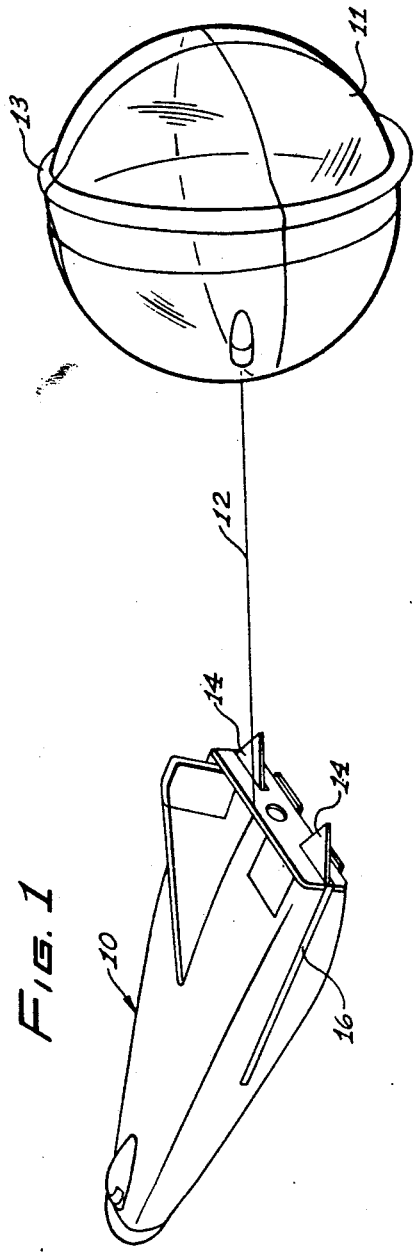
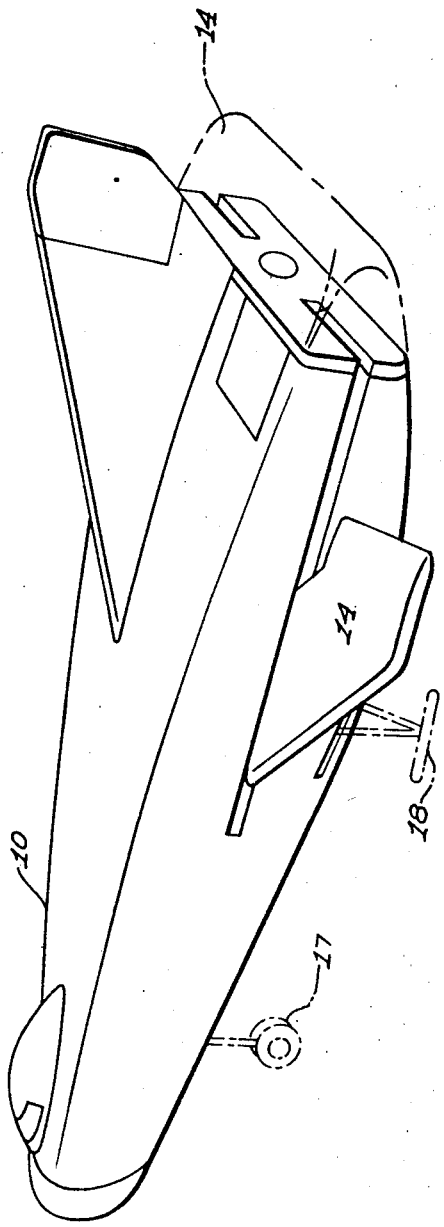
INVENTOR.
RAYMOND P. WYKES
BY Richard D. Seibel
ATTORNEY

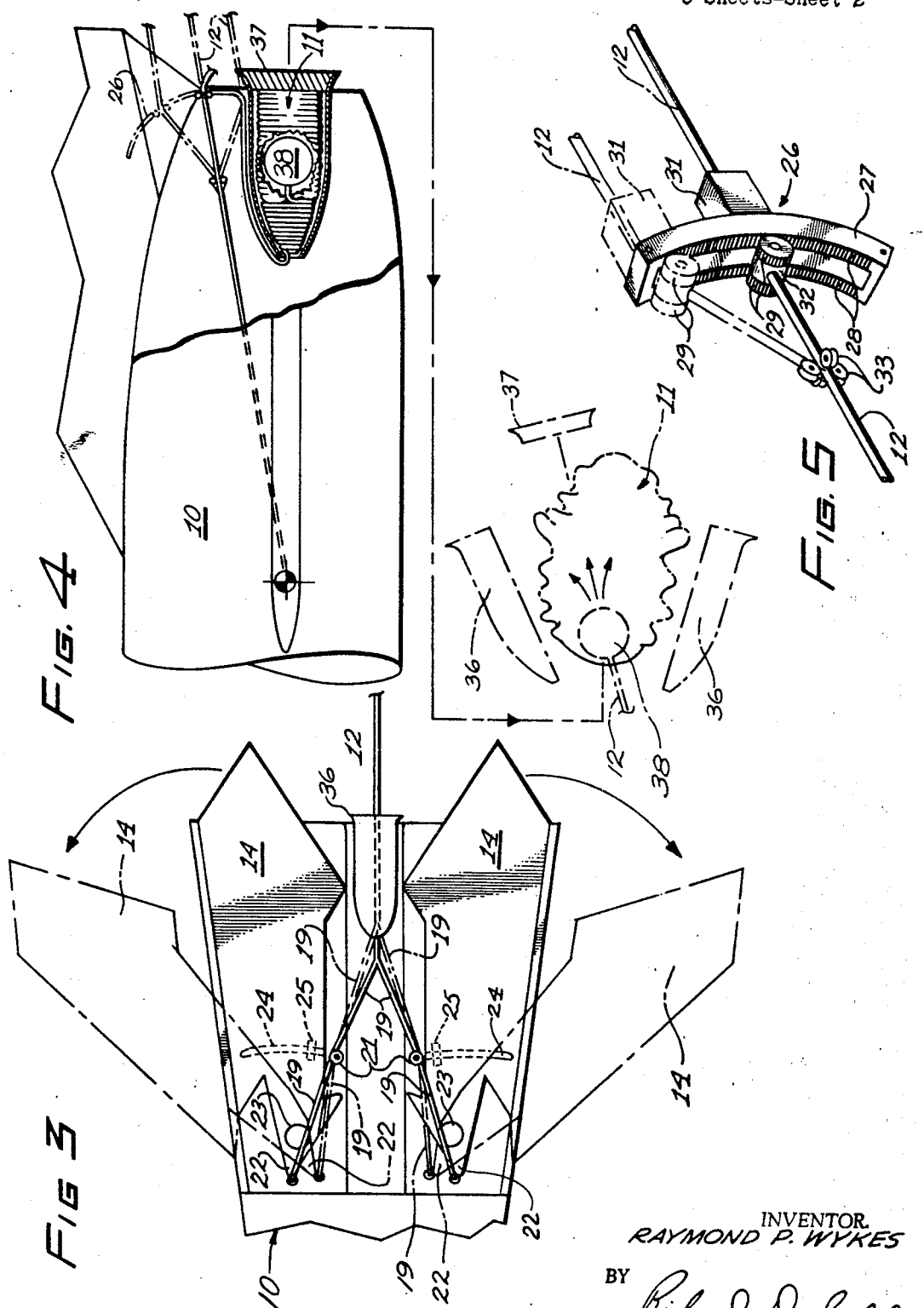

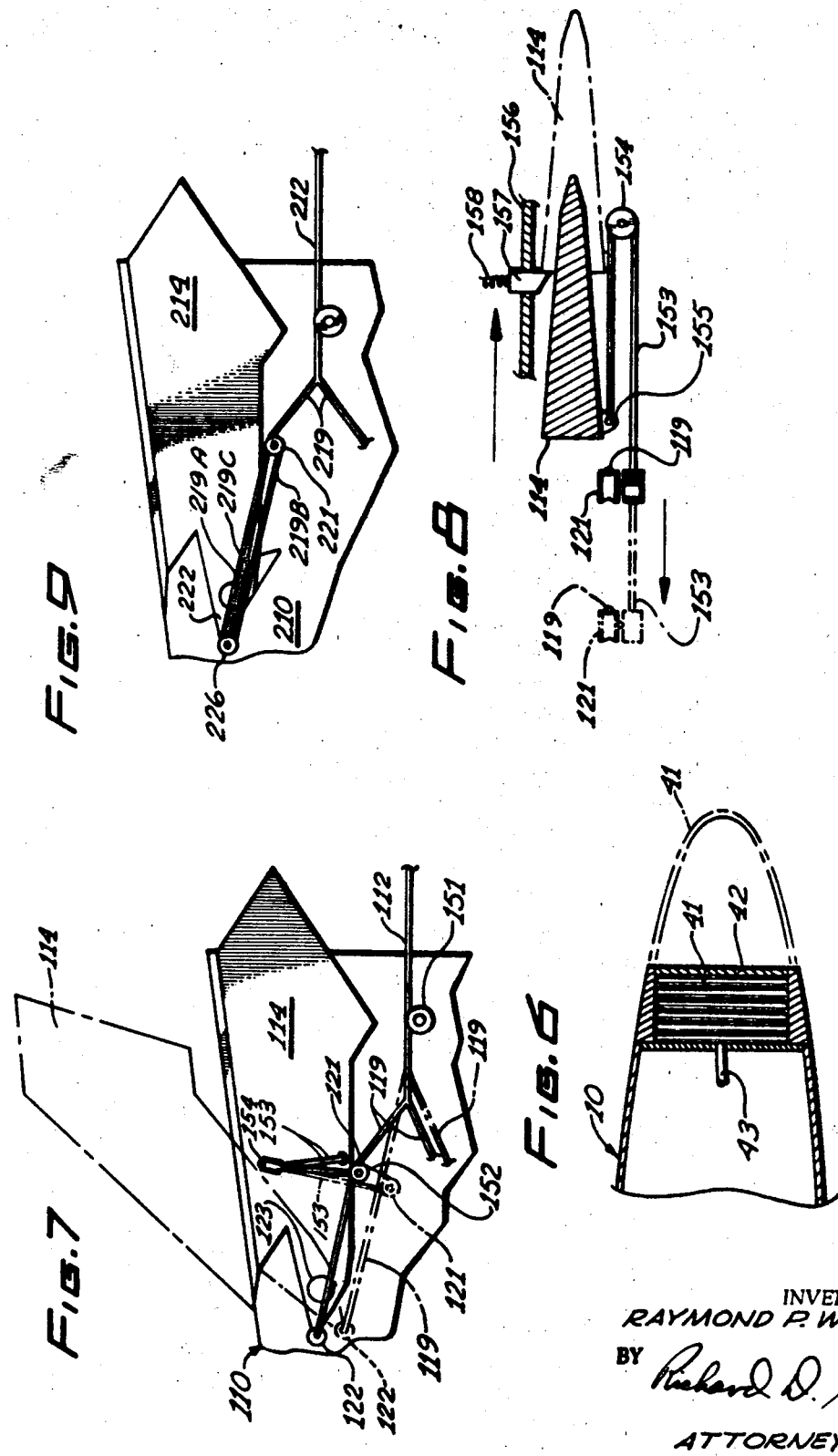

United States Patent Office 3,390,853
Patented July 2, 1968

3,390,853
VARIABLE GEOMETRY RE-ENTRY VEHICLE
Raymond P. Wykes, Los Angeles, Calif., assignor to North American Rockwell Corporation, a corporation of Delaware
Filed May 23, 1966, Ser. No. 552,188
15 Claims. (Cl. 244—113)

ABSTRACT OF THE DISCLOSURE

A lifting body re-entry vehicle is described having adequate heat resistance and lift characteristics at high velocities. In order to augment the lift over drag ratio at low aerodynamic speeds, lifting surfaces in the form of wings are deployed on opposite sides of the body of the vehicle after entry into the atmosphere. The force for deploying the wings forwardly against aerodynamic drag is provided by an inflatable drag device such as a balloon trailing behind the re-entry vehicle on a cable. The cable is connected to the ends of the wings inboard of a pivotal mounting thereof so that the force on the cable pivots the outboard end of the wings outwardly and forwardly into the aerodynamic stream for increasing lift over drag ratio.

---

This invention relates to re-entry vehicles and in particular relates to a lifting vehicle with lower lift over drag ratio at high velocities and increased lift over drag ratio at low velocities.

Existing vehicles for re-entering the earth's atmosphere from space have shapes designed for acceptance of high aerodynamic heating and these shapes result in a low lift over drag ratio ($L/D$) at supersonic and subsonic speeds. Because of the low $L/D$ controlled landings have been difficult with these vehicles and parachute deceleration and brute force of the vehicle structure have been relied upon to minimize potential damage to test equipment. For maximum economy vehicles are required to land more or less conventionally, be reserviced and reused without extensive rebuilding of the airframe. They must have the potential which will give the crew adequate capability to correct re-entry errors, select any of several landing sites, and change flight paths after re-entry. A suitable means for providing this potential comprises a lifting body re-entry vehicle with stowable variable geometry lifting surfaces. By deploying wings from a lifting body the planform area of the vehicle can be increased to increase the $L/D$. Previously hydraulic or pneumatic actuators have been considered necessary to provide the required force to overcome the drag and friction forces resulting from extension of the wings or lifting surfaces. It has been necessary to provide an actuating unit for each lifting surface and a common fluid handling system to ensure symmetrical deployment. These units are relatively heavy which is a severe disadvantage in space vehicles.

It is therefore a broad object of this invention to provide a means for deploying lifting surfaces from a re-entry vehicle.

Thus in the practice of this invention according to a preferred embodiment there is provided an aerodynamic lifting body useful as a space vehicle for entering the earth's atmosphere. Pivotally mounted wings are provided within the body of the vehicle during all flight modes except terminal maneuvering. In order to provide an improved lift over drag ratio at low velocities the wings are pivoted outwardly from the body of the vehicle to provide additional lift. A trailing drag device with controlled drag characteristics is deployed behind the re-entry vehicle on the end of a cable. The cable is connected over pulleys to the deployable wings and the force on the cable due to the drag device acts on the wings to pivot them from within the body into the air stream. The drag device trailing behind the vehicle also enhances the stability of the vehicle, augments pitch control, and provides additional drag for controlled deceleration.

Thus it is a broad object of this invention to provide a simple means for deploying wings on a re-entry vehicle.

It is another object of this invention to provide a stable aerodynamic vehicle with high lift over drag ratio.

It is a further object of this invention to provide a controllable re-entry vehicle.

Other objects and many of the attendant advantages of this invention will be readily appreciated as the same becomes better understood by reference to the following detailed description when considered in connection with the accompanying drawings wherein:

FIG. 1 illustrates a re-entry vehicle and drag device constructed according to the principles of this invention;
FIG. 2 illustrates the re-entry vehicle of FIG. 1 with the wings deployed for low velocity flight;
FIG. 3 is a top sectional view of the vehicle of FIG. 1 illustrating the wing actuating mechanism;
FIG. 4 is a partial side section of the vehicle of FIG. 1 illustrating the stowed drag device;
FIG. 5 illustrates a pitch control mechanism for the vehicle of FIG. 1;
FIG. 6 illustrates an inflatable afterbody for the vehicle of FIG. 1;
FIG. 7 illustrates an alternative deployment mechanism;
FIG. 8 is a schematic section of FIG. 7; and
FIG. 9 illustrates an alternative wing deployment mechanism.

Throughout the figures like numerals refer to like parts.

FIG. 1 illustrates a re-entry vehicle incorporating the principles of this invention. As illustrated in this embodiment there is provided a re-entry vehicle 10 that can be employed, for example, as a space vehicle for re-entering the earth's atmosphere. A number of specific geometries for such a vehicle with a lift over drag ratio ($L/D$) at hypersonic velocity on the order of 1.2 or more are well known. Behind the ren-entry vehicle as illustrated in FIG. 1 is a drag device 11 that is secured to the re-entry vehicle by a cable 12. The cable is preferably a metal cable with high temperature strength and can be provided with an ablative or other insulating coating. It may also be convenient to employ a coaxial cable with electric leads for modulation of drag of the drag device if desired.

As illustrated in FIG. 1 the drag device 11 comprises an inflatable sphere having a burble fence 13 therearound. A spherical shape is highly efficient at high velocities, with a high drag and excellent stability. The sphere alone, however, has some instability in the subsonic flow regime due to unbalance of forces caused by unsteady shedding of vortices into the wake of the sphere. In order to increase stability at subsonic speeds an inflatable toroidal burble fence 13 is provided aft of the center of the sphere in order to positively trip the flow over the spherical body from laminar to turbulent flow. This provides good stability for subsonic and trans-sonic speeds and gives a drag coefficient of from about .8 to 1.0. The high drag of the drag device trailing behind the re-entry vehicle gives controlled deceleration of the vehicle in high altitude rarified atmosphere for minimizing the heating load on the re-entry vehicle.

Although a spherical drag device has been illustrated in the preferred embodiment, it will be understood that other types of drag devices can be employed in the practice of this invention. Thus, for example, a conical inflatable structure having an apex angle of about 80° is highly satisfactory for Mach numbers above about 2.0 giving a drag coefficient of about 0.8 to 1.0. A conical drag device as illustrated in FIG. 1 of U.S. Patent 3,212,730 is suitable for use. The spherical or conical inflatable structures are preferably formed of coated woven materials such as textiles formed of super alloy fibers in ultra fine filaments. Many nickel base super alloys are available in thin fibers that are readily woven into flat sheets that can be cut into gores for forming the drag devices or woven directly into curved shapes. Inflation of the inflatable drag devices can be by means of stored pressurized gas as in the preferred embodiment or can be by means of ram air collected by slit or screen type inlets during re-entry.

Another type of drag device suited for use in the practice of this invention is the so-called AVCO drag brake. This comprises a mechanically expandable hemispherical structure formed of a plurality of spherical segments. This drag device is directed with the convex surface forward, generally like an inverted umbrella, and gives a substantially constant drag coefficient slightly above unity in a supersonic region. The drag is lower in the subsonic region and remains stable throughout the flight regime due to self-aligning aerodynamic moments. Any of the three mentioned drag devices has a modulatable drag by changing the cross-section of the drag device. Thus in the inflatable structures the degree of inflation can be varied to obtain a degree of modulation in the total drag. The mechanically expandable drag brake is modulated by varying the degree of extension of the spherical segments.

Conventional ribbon, flat, or hemispherical parachutes are not suitable for use at supersonic velocities due to instability. A parachute has a fixed drag after deployment and the drag cannot be modulated to meet various aerodynamic situations. It is preferred to employ a drag device with which the drag can be modulated so that the descent time can be varied, along with the range of the vehicle. This permits the crew a better selection of landing sites and permits a flight profile that minimizes the aerodynamic heating. Without the trailing drag device high angles of attack are required in the re-entry vehicle in order to obtain sufficient deceleration and this leads to substantial heating, stability and structural problems. These problems are mitigated over a large portion of re-entry by deployment of an aerodynamically stable, modulatable, high drag device trailing behind the re-entry vehicle.

In the re-entry vehicle 10 as illustrated in FIG. 1 deployable wings 14 are stowed within the body of the vehicle with the tips of the wings extending aft of the vehicle body. In order to provide aerodynamic smoothness and thermal protection at high velocities atendant on re-entry, a protective cover 16 is provided along the side of the vehicle over a slot from which the wings are later deployed. The protective cover 16 is jettisoned by conventional explosive or mechanical releases (not shown) at the time the wings are to be deployed.

FIG. 2 illustrates the aerodynamic re-entry vehicle 10 after the wings 14 have been deployed from the sides of the vehicle. The wings increase the planform of the vehicle for low velocity flight thereby increasing the $L/D$ to as much as five or more. Also shown in phantom in FIG. 2 is a conventional nose landing wheel 17 and landing skids 18 for landing the vehicle on a conventional runway. During hypersonic velocity flight the aft end of the re-entry vehicle is substantially flat, and, in order to increase the $L/D$ at low velocities, it is desirable to provide a smooth aerodynamic shape to the aft end of the vehicle. Thus, as shown in phantom in FIG. 2 and described hereinafter, an inflatable afterbody 41 is provided over the flat end of the vehicle to provide aerodynamic smoothness.

FIG. 3 illustrates in a top partial section the internal structure of the re-entry vehicle 10 that provides for deployment of the wings 14 into the air stream. The cable 12 from the drag device is split into two cables 19 within the body of the vehicle. The two cables 19 and the wings 14 to which they are attached are substantially identical on each side of the vehicle and only one will be described in detail hereinafter. The cable 19 passes over an idler pulley 21 that is mounted on the body of the vehicle. The pulley is preferably coated with Teflon or the like for low friction. The end of the cable 19 is secured to an extending tab 22 on the inboard end of the wing 14. The wing is secured to the body of the vehicle by a conventional pivot 23 that is sufficiently large to accommodate the lifting forces of the wing during flight. A conventional track 24 is provided beneath the wing in the body of the vehicle and a conventional follower 25 (hidden in FIG. 3) is provided on the wing and riding in the track for accommodating a portion of the lifting force of the wing. If desired, a conventional pressure bearing on the upper portion of the wing can also be employed in the practice of this invention to accommodate a portion of the lifting force.

As illustrated in FIG. 3 the wings 14 are stowed within the body of the re-entry vehicle for high velocity flight in early stages of re-entry. Also shown in FIG. 3, in phantom, are the wings 14 after being extended or deployed into the air stream. This figure also shows the position of the cables 19 when the wings are stowed within the body and, in phantom, the position of the cables after wing deployment.

Tension on the cable 12 and hence on the cables 19 produces a force on the tab 22 on the inboard end of the wing. The direction of this force is along the length of the cable and since this lies inboard of the center of the pivot 23, a moment about the pivot is produced tending to pivot the wing outwardly relative to the body of the vehicle. As the wing pivots outward into the air stream, the drag and friction forces on the wing increase. The increasing force on the wing is accommodated by an increase in the moment on the wing applied by the cable 19. The increased moment is produced because of the increased moment arm as the tab 22 rotates about the pivot 23. The force on the cable 19 stays substantially the same during deployment, however, the moment arm, that is the distance between the cable and the center of the pivot, increases as the wing rotates. The total force on the cable 12 and hence moment on the tab 22 is more than sufficient to fully extend the wing into the air stream.

Distinct advantages lie in using cables from the drag device coupled directly to tabs on the wings. Not only is the force always directed along the length of the cable with no bending moments introduced, the position of the cable can change during deployment to change the moment arm and the total pivoting moment. Rigid mechanisms to perform such a function are heavy and cumbersome and subject to considerable bending forces. Another advantage of the cable linkage is in the force multiplication possible with pulley arrangements as described hereinafter. Still a further advantage of using cables for the linkage lies in the ability to route the cables over a devious path by way of idler pulleys if necessary or desirable to avoid portions of the vehicle's basic structure. Symmetry of wing extension is readily obtained with cable linked systems by adjusting cable lengths with turnbuckles or the like after assembly.

The increasing drag force on the wing tends to reduce the speed of deployment as the wing approaches the fully extended position, however, in addition in order to prevent structural damage a snubber (not shown) can be provided near the end of the wing travel to bring the wing to a gentle stop. After the wing is fully extended, it is latched into the extended position so that the drag device can be jettisoned for landing at maximum $L/D$ if desired. A latch such as described hereinafter in relation to FIG. 8 can be employed on the aft edge of the wing within the body of the vehicle; a conventional grapple lock can be employed on the leading edge of the wing within the vehicle body or a ratchet type catch on the track and follower can be employed for latching the wing in the extended or deployed position.

A significant feature of utilizing a remote drag device behind the re-entry vehicle is that the directional and pitch stability of the vehicle is enhanced, particularly at hypersonic and supersonic velocities. This minimizes the need for large vertical surfaces having large angles of flare for producing the desired directional stability at high velocities. It will be apparent to one skilled in the art that vertical surfaces for lower speed flight can be deployed from the vehicle body in the same manner as the horizontal wing surfaces by employing the force of the drag device.

In order to provide good stability in a re-entry vehicle, it is preferred that the cable 12 between the vehicle and the drag device extend from the extreme aft end and in line with the center of gravity of the re-entry vehicle. In order to obtain good lift over drag in a re-entry vehicle it is also necessary to have a relatively high angle of attack during flight; thus, the cable extends from the aft end of the re-entry vehicle at a point above the centerline of the vehicle as illustrated in FIG. 4. Here it can be seen that the cable 12 lies on a line extending through the center of gravity of the vehicle during normal flight. It may be desirable, however, to vary the angle of attack of the re-entry vehicle during flight with the drag device deployed in order to modulate the lift and control the range of the vehicle. This can be accomplished by varying the point above the vehicle centerline from which the cable 12 extends. Thus, for example, by elevating the cable exit point at the aft end of the vehicle, the angle of attack of the vehicle must increase so that the cable still extends from a line through the center of gravity of the vehicle.

Such a pitch control mechanism 26 is illustrated schematically at the aft end of the vehicle in FIG. 4 and in detail in FIG. 5. In a preferred embodiment the pitch control mechanism 26 comprises an arcuate frame 27 that is fixedly secured to the body of the aerodynamic vehicle. On the concave side of the frame 27 there are provided two racks 28 comprising a plurality of standard gear teeth. Riding on the two racks 28 are a pair of pinions 29 that are driven by an electric motor 31. The pinions are mounted on a cable guide 32 through which the cable 12 to the drag device passes freely. Additional cable guide pulleys 33 are employed to keep the cable in line with the wing deploying mechanism during pitch controlling maneuvers.

During normal flight with an optimum angle of attack, the cable guide is positioned in approximately the center of the frame 27 by the pinions 29 riding in the racks 28. When it is desired, for example, to increase the angle of attack of the re-entry vehicle, it is necessary to elevate the cable 12 relative to the aft end of the vehicle. This is accomplished by driving the pinions 29 upward relative to the frame 27, carrying the cable guide 32 and cable 12 along with the pinions. FIG. 5 illustrates the cable and cable guide in the center portion in the frame 27 and, in phantom, the cable and cable guide in an elevated position. Such a pitch control mechanism can serve to vary the angle of attack of a re-entry vehicle either alone or in combination with other pitch control mechanisms. It will be apparent that a similar mechanism can be employed to augment yaw control of the vehicle.

FIG. 4 also illustrates a means for storing the spherical drag device of the preferred embodiment. As illustrated therein there is provided a split canister 36 with an aerodynamic shape. A protective cover 37 is provided over the mouth of the canister. The drag device 11 is folded within the canister 36 and includes a container 38 for compressed gas for inflating the drag device. When folded and packed into the canister the drag device has from 3 to 5% of its inflated volume. Also within the canister 36 is a coil of cable 12 that is uncoiled and deployed upon ejection of the storage canister. Upon ejection of the canister 36 from the re-entry vehicle the canister trails behind because of aerodynamic drag, which causes the cable 12 to uncoil and extend between the drag device and the re-entry vehicle. By forming the canister 36 is an aerodynamic shape the deceleration of the canister is relatively slow so that the snatch force of the drag device on the cable is at a reasonable value. When the cable 12 is fully extended, the inflation of the drag device commences thereby ejecting the segments of the split canister 36 and the protective cover 37 as illustrated in phantom in FIG. 4. The force on the cable 12 steadily increases as the drag device is inflated and if desired the rate of inflation can be varied or the inflation can be interrupted in order to modulate drag during various stages of re-entry.

Initially, after full extension of the drag device from the vehicle, the cable is snubbed to the body of the vehicle or the wings are locked in the stowed position so that the drag force acts only to assist in decelerating the vehicle. In later stages of re-entry when the vehicle velocity is lower and sufficient energy has been dissipated, the restraint is released and the cable force acts on the wings for extending them symmetrically into the air-stream. After the wings are deployed and the L/D of the vehicle increased, it may be desirable to further improve the L/D by jettisoning the drag device. This is optional, however, and in mnay situations it may be desirable to retain the drag device for continued high deceleration clear through landing.

As has been mentioned it may be desirable in order to obtain a high lift over drag ratio during relatively low velocity flight to employ an aerodynamically smooth afterbody on the aft end of the vehicle. Such an aerodynamically smooth body can readily be provided by an inflatable structure 41 on the flat aft end of the re-entry vehicle as is illustrated in phantom in FIG. 2. A convenient way of deploying such an afterbody is by inflation of a stowed structure during the later phases of re-entry. Thus, as illustrated in FIG. 6, there is provided a protective cover 42 at the flat aft end of the re-entry vehicle. A compartment in the body of the vehicle contains the inflatable afterbody 41 in a folded condition. Inflatable structures of this sort are readily fabricated from Air-Mat material available from Goodyear Company. The Air-Mat is a double walled material with interconnecting threads therebetween for holding a preselected geometry after inflation with relatively low pressure. A tube 43 leads to a conventional gas source such as a gas generator, ram air, or pressurized gas for inflating the afterbody 41. When it is desired to deploy the afterbody the protective cover 42 is ejected and gas is added to the preformed afterbody so that it is inflated to have a shape substantially as shown in phantom in FIG. 6. The inflatable afterbody modifies the aerodynamic characteristics and decreases drag. It also enhances the aerodynamic stability of the vehicle by shifting the center of pressure and center of volume relative to the center of gravity.

When deploying wings in a re-entry vehicle it may be desirable to increase the deploying force during the early stages of deployment in order to overcome inertia and initial friction forces. An arrangement for providing such an additional force in the first stage of deployment is illustrated in FIG. 7. As illustrated in this embodiment there is provided a re-entry vehicle 110 of which only an aft portion is illustrated in FIG. 7 in a horizontal section. In this embodiment wing 114 is illustrated in a stowed position within the body of the vehicle and, in phantom, in a deployed position. A cable 112 is provided between a drag device (not shown) and the re-entry vehicle 110. The cable 112 is wrapped around a snubbing reel 151 that serves to secure the cable to the body of the re-entry vehicle for increased drag until such time as it is desired to extend the wings 114. The reel 151 may also be employed to provide a friction force during drag device deployment in order to minimize shock loads on the vehicle structure.

After passing over the reel 151 the cable 112 is divided into two cables 119 each of which passes over an idler pulley 121 and thence to a fixed connection on a tab 122 on the inboard end of the wing. For purposes of illustration only one wing and cable arrangement is shown in FIG. 7. The wing is pivoted to the body of the re-entry vehicle by a pivot 123 and other bearing surfaces can be provided if desired in order to accommodate the lifting forces of the wing. The pulley 121 is mounted in a track 152. As the force on the cable 112, and hence the cable 119, increases upon release of the reel 151, there is a sidewise force transmitted to the pulley 121 tending to move it along the track 152 toward the centerline of the vehicle.

As is more clearly seen in the schematic drawing of FIG. 8, a cable 153 has an end secured to the pulley mount so as to move with the pulley 121. The cable 153 passes over an idler pulley 154 that is attached to the body of the re-entry vehicle. The other end of the cable is in turn secured to an attach point 155 on the wing 114. Thus as the pulley 121 is caused to move along the track by the cable 119 there is a force generated in the cable 153 leading to the wing and this force tends to pivot the wing outwardly about the pivot 123. Although with the angles illustrated in the embodiment of FIG. 7 the force on the pulley 121 by the cable 119 may not be large, the moment arm from the pivot to the cable attach point 155 can be fairly large thereby giving a substantial deployment force to the wing. Likewise by routing the cable 119 over additional idler pulleys the angle of application of the force on the idler pulley 121 can be increased to as much as twice the force on the cable. After initial extending motion of the wing, the pulley 121 is at the end of its normal travel in the track 152 and the cable 119 is substantially straight. Further deployment of the wing occurs due to the force of the cable 119 in the same manner as the cable 19 illustrated in relation to FIG. 3. It will be apparent that instead of a cable attachment of the pulley mount to the wing, a cog drive that runs off of the end of a rack could also be employed to provide a driving force for initiating wing deployment.

FIG. 8 also illustrates schematically a typical arrangement for latching an extended wing into a position in the air stream. As illustrated in this embodiment there is provided a plate 156 secured to the body of the aerodynamic vehicle and a latch member 157 extending through the plate. A spring 158, for example, biases the latch member toward the wing 114. As the wing is deployed the angle thereon depresses the latch member 157 and when the wing is fully extended the spring 158 extends the latch member to provide a positive lock against an edge of the wing 114. It will be apparent to one skilled in the art that this is but one means for latching the extending wing into the deployed position and that other latching means can also be employed.

A distinct advantage in employing a cable actuated system for deploying the wings of a re-entry vehicle lies in the force multiplication that can be obtained from such a system. Thus there is illustrated schematically in FIG. 9 a pulley arrangement for multiplying the force on the cable to produce a sufficient moment for deploying the wings. Such an arrangement may be desirable, for example, where structural considerations in the vehicle body limit the space available so that the tab on the inboard end of the wings is necessarily short. Thus as illustrated in FIG. 9 there is provided an aerodynamic vehicle 210 having deployable wings 214. A cable 212 is provided leading to a drag device such as has been previously described and illustrated. The cable 212 is split into two cables 219 each of which passes over an idler pulley 221 only one of which is illustrated in FIG. 9. A length of cable designated 219A extends over an idler pulley 226 and returns towards the pulley 221 as length 219B. The length of cable 219B then passes over a second idler pulley mounted coaxially with the idler pulley 221 (hidden in FIG. 9) and returns toward the idler pulley 226 as a length of cable designated 219C. The end of the cable length 219C is fixedly secured to a tab 222 on the inboard end of the wing 214. Force on the cable 212 and hence on the cables 219 thus acts on the tab 222 on the wing 214 to pivot the wing into an extended position in the same manner as previously described. The force acting on the tab 222 is, however, three times the force on the cable 219 due to the pulley arrangement wherein two additional cables, 219A and 219B, act on the pulley 226 which is attached to the wing. It will be apparent to one skilled in the art that other degrees of force multiplication can be obtained by varying the number and location of the pulleys in the system.

Obviously many modifications and variations of the present invention are possible in light of the above teachings. It is therefore to be understood that within the scope of the appended claims the invention may be practiced otherwise than as specifically described.

What is claimed is:

1. A vehicle comprising:
    a body;
    first and second lifting surfaces mounted on said body;
    drag means for trailing behind said vehicle for generating a drag force in a flowing airstream; and
    cable means for transmitting the drag force to said lifting surfaces for moving said first and second lifting surfaces into first and second lift producing positions extending laterally from said body on opposite sides thereof.

2. The structure of claim 1 wherein each of said lifting surfaces has an inboard and an outboard end and is pivotally mounted on said vehicle so that the outboard end of each of said lifting surfaces is pivotable forward relative to said vehicle toward the lift producing position; and wherein
    said cable means is connected to said lifting surfaces inboard of the pivotal mounting for said lifting surfaces so that a rearward drag force on said cable urges said lifting surfaces toward the lift producing position.

3. The structure of claim 2 wherein said cable means comprises:
    a primary cable connected to said drag means and entering the aft end of said vehicle;
    a first cable connected to said primary cable and connected to a first one of said lifting surfaces for pivoting thereof; and
    a second cable connected to said primary cable and connected to a second one of said lifting surfaces for pivoting thereof.

4. The structure of claim 3 wherein said drag means comprises an expandable device having a high coefficient of drag relative to said vehicle.

5. The structure of claim 4 wherein said expandable device is inflatable.

6. The structure of claim 1 wherein said lifting surfaces comprise a pair of symmetrical wing members pivotably mounted on said vehicle for pivoting between a stowed position wherein said wing members are substantially enclosed in said vehicle and said lift producing positions wherein substantial portions of said wing members extend laterally from the body of said vehicle for producing lift in a flowing airstream;
    said cable means being connected to said wing members for urging said wing members toward the lift producing positions; and
    means for locking said wing members in the lift producing positions.

7. The structure of claim 6 further comprising:
    means for controlling contact position of said cable means between said vehicle and said drag means relative to said vehicle body for controlling orientation of said vehicle.

8. The structure of claim 7 wherein said means for controlling position comprises:
a rack mounted on said vehicle;
a pinion in driving engagement with said rack;
a cable guide connected to said pinion, said cable guide engaging said cable means for translating said cable means relative to said vehicle.

9. The structure of claim 6 further comprising:
means for temporarily snubbing said cable means to said vehicle and for releasing said cable means for temporarily restraining the urging of said cable means on said wing members.

10. The structure of claim 6 further comprising:
an idler pulley mounted for movement relative to said vehicle, said cable means engaging with said pulley; and
interconnecting means between said idler pulley and one of said wing members for movement of said wing member concomitant with movement of said idler pulley.

11. The structure of claim 6 further comprising:
an idler pulley mounted on one of said wing members, said cable means engaging with said idler pulley for multiplying the force of said cable means on said wing member.

12. The structure of claim 6 wherein said drag means comprises an inflatable device having a high coefficient of drag relative to said vehicle;
said cable means comprises a primary cable connected to said drag means and entering the aft end of said vehicle; a first cable connected to said primary cable and connected to one of said wing members inboard of the pivotable mounting thereof; and a second cable connected to said primary cable and connected to the other of said wing members inboard of the pivotable mounting thereof so that a rearward drag force on said primary cable urges said wing members toward the lift producing position; and further comprising
means for controlling position of said primary cable relative to the aft end of the body for controlling orientation of said vehicle; and
means for temporarily snubbing said cable means to said body and for releasing said cable means for temporarily restraining the urging of said cable means on said wing members.

13. A vehicle adapted for travel in and between areas of relatively low and relatively high density comprising:
a re-entry lifting body having a configuration adapted to provide lift at hypersonic speeds with a maximum tolerance of aerodynamic heating;
a pair of rigid lifting surfaces mounted to the body for movement from a retracted re-entry position to a lift producing position wherein each lifting surface extends laterally from said body on opposite sides thereof;
a drag device mounted in the body and ejectable therefrom; and
means connected with the drag device for moving the lifting surfaces to said lift producing position in response to aerodynamic forces acting on the drag device.

14. The vehicle set forth in claim 13 including:
a canister stowed within the aft end of the body and ejectable therefrom;
said drag device comprising a folded inflatable member and a container of compressed gas connected therewith within the canister;
said means for moving the lifting surfaces comprising a cable having the respective end portions thereof connected with the lifting surfaces and the inflatable member.

15. A vehicle comprising:
a body;
aerodynamic surface means movable between first and second positions, wherein said surface means in said first position has a minimum aerodynamic effect on said body and wherein said surface means in said second position extends from conjunction with said body for modifying the aerodynamic characteristics of said body;
aerodynamic drag means aft of said body for generating a drag force in a flowing airstream; and
means for transmitting the drag force to said aerodynamic surface means for moving said surface means between said first and second positions.

References Cited
UNITED STATES PATENTS

| | | | |
|---|---|---|---|
| 2,510,843 | 6/1950 | Townshend | 244—1 X |
| 2,673,047 | 3/1954 | Scarato | 244—49 |
| 3,139,248 | 6/1964 | Alvarez-Calderon | 244—42 |
| 3,301,511 | 1/1967 | Webb | 244—138 |

FERGUS S. MIDDLETON, *Primary Examiner.*

MILTON BUCHLER, *Examiner.*

P. E. SAUBERER, *Assistant Examiner.*